United States Patent
Haas et al.

(10) Patent No.: US 7,546,494 B2
(45) Date of Patent: Jun. 9, 2009

(54) SKEW-CORRECTING APPARATUS USING DUAL LOOPBACK

(75) Inventors: Wally Haas, Mount Pearl (CA); Mutema John Pittman, St. John's (CA); Chuck Rumbolt, St. John's (CA)

(73) Assignee: Avalon Microelectronics Inc., Mount Pearl (CA)

( * ) Notice: Subject to any disclaimer, the term of this patent is extended or adjusted under 35 U.S.C. 154(b) by 228 days.

(21) Appl. No.: 11/462,151

(22) Filed: Aug. 3, 2006

(65) Prior Publication Data
US 2008/0031311 A1 Feb. 7, 2008

(51) Int. Cl.
G11B 20/20 (2006.01)
G01R 31/28 (2006.01)

(52) U.S. Cl. ...................... 714/700; 714/716

(58) Field of Classification Search ................. 714/700, 714/716
See application file for complete search history.

(56) References Cited

U.S. PATENT DOCUMENTS

| | | | |
|---|---|---|---|
| 6,079,035 A * | 6/2000 | Suzuki et al. ............. | 714/700 |
| 6,201,831 B1 | 3/2001 | Agazzi et al. | |
| 6,336,192 B1 * | 1/2002 | Sakamoto et al. .......... | 713/503 |
| 6,557,110 B2 * | 4/2003 | Sakamoto et al. .......... | 713/503 |
| 6,690,757 B1 | 2/2004 | Bunton et al. | |
| 6,820,234 B2 | 11/2004 | Deas et al. | |
| 6,834,255 B2 * | 12/2004 | Abrosimov et al. ......... | 702/181 |
| 6,839,862 B2 | 1/2005 | Evoy et al. | |
| 6,907,552 B2 | 6/2005 | Collins | |
| 6,920,576 B2 | 7/2005 | Ehmann | |
| 6,937,681 B2 * | 8/2005 | Watanabe ................. | 375/371 |
| 6,996,738 B2 | 2/2006 | Chiang | |
| 7,012,935 B2 | 3/2006 | Woelk et al. | |
| 7,093,172 B2 * | 8/2006 | Fan et al. ................ | 714/716 |
| 7,124,334 B2 * | 10/2006 | Kashiwakura ............. | 714/712 |
| 7,209,907 B2 | 4/2007 | Cherukuri et al. | |
| 7,363,563 B1 * | 4/2008 | Hissen et al. ............. | 714/733 |
| 7,401,246 B2 | 7/2008 | Martin et al. | |
| 2003/0142772 A1 | 7/2003 | Weiss et al. | |
| 2004/0123190 A1 | 6/2004 | Toyoda et al. | |
| 2004/0136411 A1 | 7/2004 | Hornbuckle et al. | |
| 2005/0005051 A1 | 1/2005 | Tseng | |
| 2005/0005184 A1 | 1/2005 | Lindt | |
| 2005/0114724 A1 | 5/2005 | Wu | |
| 2007/0088991 A1 * | 4/2007 | Shin et al. ............... | 714/700 |
| 2008/0031312 A1 | 2/2008 | Haas et al. | |
| 2008/0126888 A1 | 5/2008 | Haas et al. | |

OTHER PUBLICATIONS

Optical Internetworking Forum (OIF), System Framer Interface Level 5 (SFI-5), Jan. 29, 2002.
Optical Internetworking Forum (OIF), System Interface Level 5 (SxI-5), Oct. 2002.

* cited by examiner

Primary Examiner—James C Kerveros

(57) ABSTRACT

An apparatus for determining the amount of skew injected into a high-speed data communications system, including a plurality of lanes having a data bus per lane, relative to a reference lane, for system skew compensation. By knowing the relative amount of skew that each lane requires for alignment, an appropriate amount of skew is then injected on each lane to provide alignment and thus compliancy with the SFI-5 and SxI-5 standards, in terms of data skew specifications. The relative skew amounts for each transmitting lane are determined using dual loopback methods.

14 Claims, 6 Drawing Sheets

FIG. 6 (Present Invention)
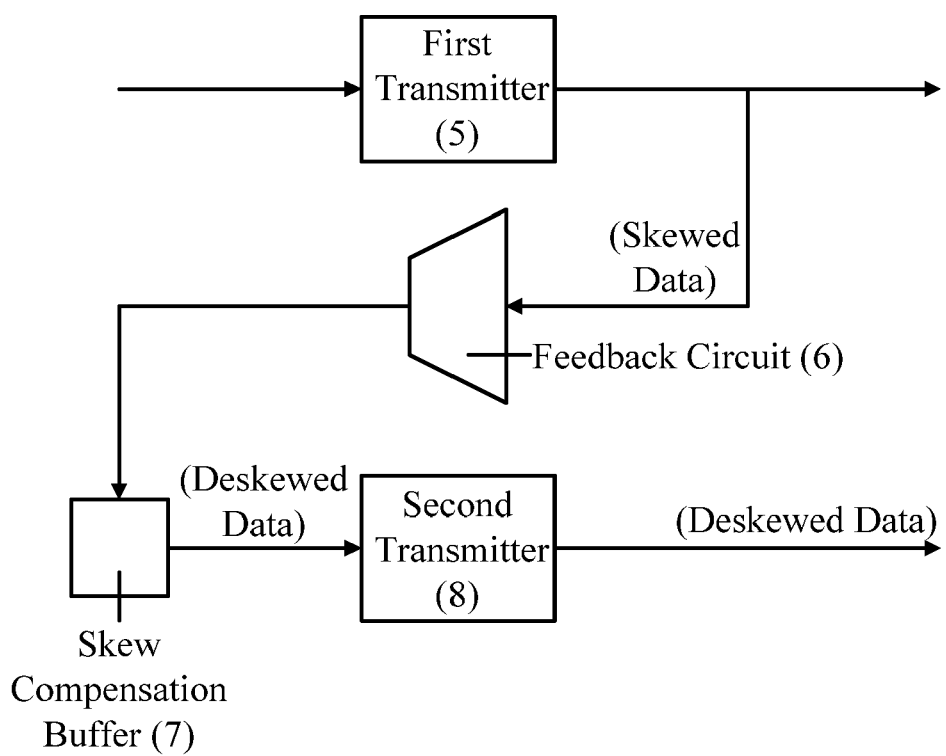

SKEW-CORRECTING APPARATUS USING DUAL LOOPBACK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to chip-to-chip high speed data communications and the detection and correction of skew in each transmit channel, relative to a reference channel.

2. Description of Related Art

Parallel transmission, as defined with respect to the present invention, is the serial transmission of data over a plurality of lines on a data bus. In this parallel data transmission, skew can be added to each serial data lane through such means as serialization, cross-clock domain crossing, or through static skew parameters such as trace length. This skew can result in different alignments between lines of the data bus. Thus, there is an obvious need to correct this skew, or to deskew the data lines. If the amount of skew added on each line can be found, then a skew injecting apparatus that can compensate for the skew added on each line can eliminate the problem, and thus adhere to relevant standards which specify skew requirements.

The following system description is applicable to any chip-to-chip high speed communications system where skew compensation may be of benefit. Specific standards mentioned throughout, such as SFI-5 and SxI-5, should be considered examples and are in no way exhaustive.

One of the standards describing the objectives and requirements of a multi-bit bus for use in the interconnection between devices in communications systems with up to 50 Gb/s optical links is published by the Optical Internetworking Forum: Serdes Framer Interface Level 5 (SFI-5): Implementation Agreement for 40 Gb/s Interface for Physical Devices, with Serdes referring to Serialization and Deserialization (Dartnell, Lerer & Lynch, 2002). The electrical I/O characteristics of this interface are defined in the standard System Interface Level 5 (SxI-5): Common Electrical Characteristics for 2.488-3.125 Gbps Parallel Interfaces (Palkert & Lerer, 2002).

The SFI-5 bus has a 16-bit wide data bus with each channel operating at up to 3.125 Gb/s with a Deskew, or Parity, Channel. The Serdes component of the communications system thus requires 17 transceivers to handle these 17 lanes. Each one of these transceivers may have different skew characteristics and therefore, may cause misalignment to the standard when transmitting data.

BRIEF SUMMARY OF THE INVENTION

To compensate for the skew differences between each individual lane on the transmit side, skew can be injected by the system into each individual lane to re-align the data. In order to determine how much skew should be injected by the system into each lane, the skew characteristics for each transmitter lane must be known. Using dual loopback techniques, these skew characteristics can be determined for each transmitter lane, and once known, can be corrected using skew injection techniques.

This is different from the current systems on the market that involve grouping bus lines with each group having its own clock domain (U.S. Pat. No. 6,839,862, Evoy, Pontius & Ehmann, 2005) or by using multiple synchronization codes (U.S. Pat. No. 6,920,576, Ehmann, 2005). As Evoy et al. describe, "by grouping the bus lines in groups with each group having its own clock domain, skew across clock-domain groups is tolerated and overcome by processing the data and the skew first within each clock domain group, and then between groups." Ehmann's solution "overcomes skewing problems by transferring digital data with automatic realignment," i.e., using synchronization codes.

The proposed system of the present invention uses neither separate clock domains for bus line groups, nor adds synchronization codes, but rather employs a dual loopback methodology to determine skew characteristics for each bus line. The skew can then be corrected by injecting offsetting skew amounts into the individual bus lines to re-align the data according to a single reference lane, thus eliminating any skew related problems and meeting all relevant standards.

BRIEF DESCRIPTION OF THE SEVERAL VIEWS OF THE DRAWING

FIG. 6 is a block diagram of the present invention, where skewed data enters a transmitter (5) and is then sent to a feedback circuit (6) and subsequent skew compensation buffer (7); the corrected data is then sent to a second transmitter (8) before proceeding down the transmitting lane.

DETAILED DESCRIPTION OF THE INVENTION

On the transmit side, skew can be injected on a per-lane basis to compensate for any skew added by the system, such as Field Programmable Gate Array (FPGA) startup conditions. This injected skew achieves compliancy as specified by applicable standards, such as SxI-5. To determine how much skew should be injected to meet these standards, the following system is implemented.

The present invention consists of N+1 transceivers for the purposes of data transmission and reception. The system is designed such that dual loopback can be used to determine the necessary per-lane skew to be added for total lane alignment.

The term "dual loopback," as used herein, refers to two transmit streams from the transmitters of two different transceivers that are looped back to the receiver portion of a transceiver. The transceiver that receives the loopback from the transmitters will also be one of the transmitting transceivers.

To allow for ordinary data flow in the receive direction multiplexers (MUXs) are used to select between feedback lines or regular data lines. In the case where selectable internal feedback is used within the transceiver and this internal feedback capability is provided by the transceiver, the amount of inputs to the multiplexer can be reduced or the need for an external multiplexer may be eliminated entirely.

In accordance with the present invention, it may be necessary to use a fanout buffer to mitigate any extra stress on the transmitting lane to preserve signal integrity. This occurs when transmitting lanes have multiple loads (i.e., output to the optics and several loopbacks to receivers).

A person skilled in the art will understand that it is necessary for one of the transceivers to be chosen as the reference. This reference transceiver can be chosen as one of the active transceivers or may be a transceiver used solely for the purpose of providing a reference. All other lanes will have their skew determined relative to this reference.

The present invention enables the calculation of the skew for each transmit lane, relative to one of the lanes. The following examples will illustrate the workings of possible systems mathematically. These examples will deal with smaller 3 transceiver systems. The 3 transceiver example is easily expandable into an SFI-5 system with 17 transceivers, or any other transceiver-based system. Transceivers are herein also referred to as MGTs (Multi-Gigabit Transceivers).

The following examples are set forth to gain a better understanding of the skew-detection portion of the invention described herein. These examples are provided for illustrative purposes only and should not limit the scope of this invention in any way.

EXAMPLE 1

External Loopback Only

Figure 1:
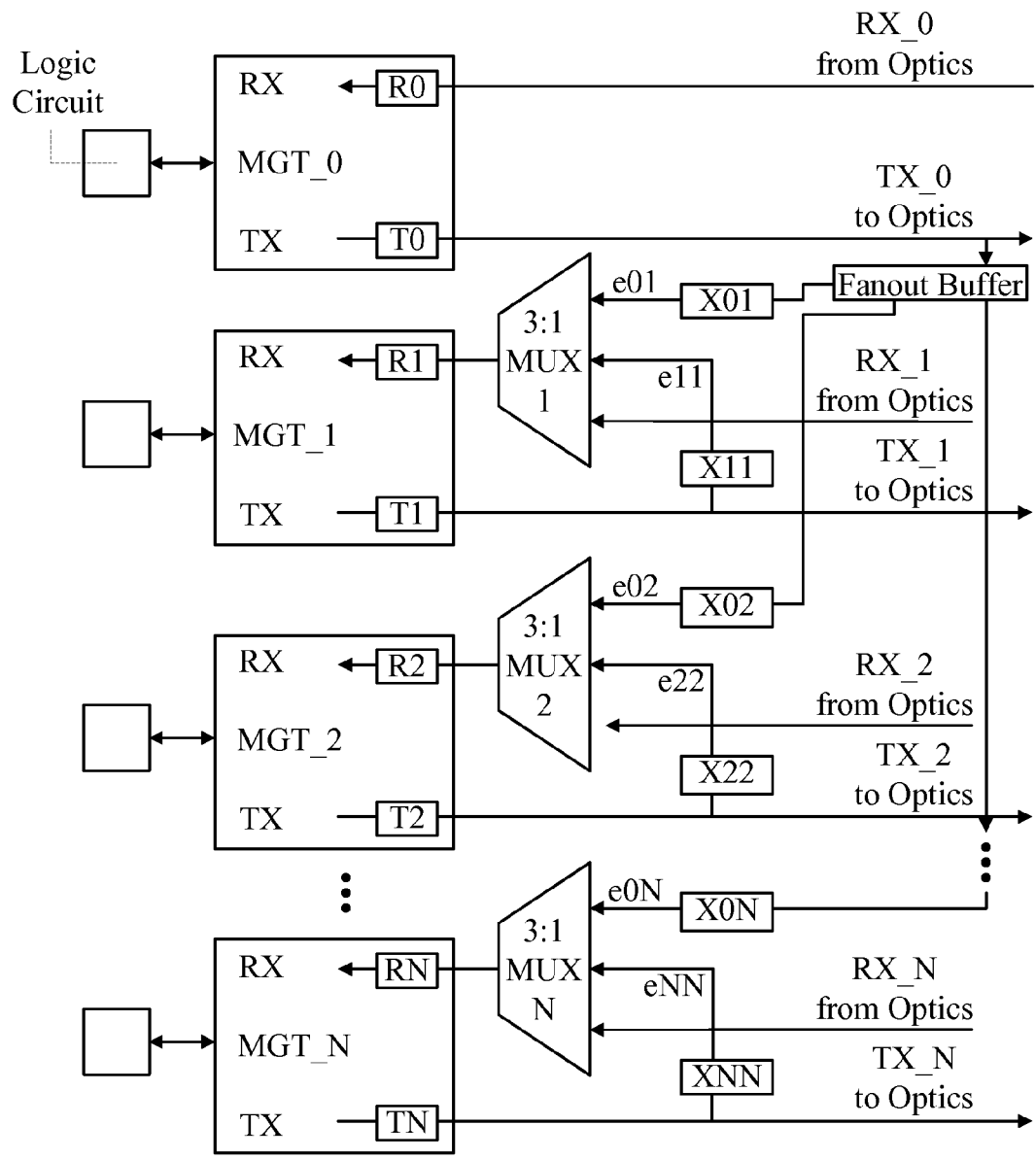
FIG. 1 is a block diagram of how the deskew algorithm may be implemented if only external loopback is used to achieve the dual loopback methodology.

The system in this case is a dual loopback system implemented using external feedback from two different transceivers, as shown in FIG. 1. In this example, a multiplexer with a minimum of three inputs will be necessary: two inputs for the external feedback lines and one input for the -regular receive line.

In Example 1, dual loopback is achieved by utilizing only external loopback to determine the relative skew amounts for each lane, as illustrated in FIG. 1. The variables and constants used in this example are defined as:

DEFINITION LIST 1

| Term | Definition |
| --- | --- |
| R1 | Unknown receive skew for MGT_1 |
| R2 | Unknown receive skew for MGT_2 |
| T0 | Unknown transmit skew for MGT_0 |
| T1 | Unknown transmit skew for MGT_1 |
| T2 | Unknown transmit skew for MGT_2 |
| X01 | Unknown external skew for path from MGT_0 to MGT_1, from buffer, MUX, and PCB (Printed Circuit Board) trace skew |
| X02 | Unknown external skew for path from MGT_1 to MGT_2, from buffer, MUX, and PCB trace skew |
| X11 | Unknown external skew for path from transmitter to receiver of MGT_1, from MUX and PCB trace skew |

-continued

| Term | Definition |
| --- | --- |
| X22 | Unknown external skew for path from transmitter to receiver of MGT_2, from MUX and PCB trace skew |
| E01 | Known external skew constant from MGT_0 to MGT_1 |
| E02 | Known external skew constant from MGT_0 to MGT_2 |
| E11 | Known external skew constant from the transmitter to receiver of MGT_1 |
| E22 | Known external skew constant from the transmitter to receiver of MGT_2 |

Constants e01, e12, e02, and e21 may be determined through empirical means, such as testing with a training sequence. This empirical information is collected by the receiver.

With reference to FIG. 1, the following equations can be formulated:

$$T0+R1+X01=e01 \tag{1}$$

$$T1+R1+X11=e11 \tag{2}$$

$$T0+R2+X02=e02 \tag{3}$$

$$T2+R2+X22=e22 \tag{4}$$

From equations (1) and (2), R1 can be equated, giving:

$$e01-T0-X01=e11-T1-X11 \tag{4}$$

Therefore, $$T1=T0+e11-e01+X01-X11$$

Similarly from equations (3) and (4) by equating R2, $$e02-T0-X02=e22-T2-X22$$

Thus, $$T2=T0+e22-e02+X02-X22$$

And in general, $$T[n]=T0+e[nn]-e[0n]+X[0n]-X[nn]$$

By taking T0 (the transmit skew for MGT_0) as a reference, it is shown that T1 can be found relative to this skew, and similarly, T2 can be found relative to T0's skew, with 2 unknowns still remaining in each equation—X[0n] and X[nn], where [n] corresponds to the MGT number.

Each X[0n] and X[nn] value can be calculated using standard procedures for trace length and PCB characteristics, as well as taking into account the skew added by each MUX and the optional buffer. These values can be calculated to an approximate theoretical value with some amount of uncertainty in each calculation. Therefore, each X[0n] and X[nn] value can be broken into the theoretical calculated value and a statistical variation from this value:

$$X[0n]=y[0n]+Z[0n]$$

$$X[nn]=y[nn]+Z[nn]$$

where y[0n] and y[nn] are the theoretical calculated values, and Z[0n] and Z[nn] are the statistical variations from this value.

Thus, the equations can be written as:

$$T[n]=T0+e[nn]-e[0n]+y[0n]-y[nn]+Z[0n]-Z[nn]$$

where Z[0n] and Z[nn] are the only unknowns.

As shown by the equation above, the amount of skew between T[n] and T0 is:

e[nn]−e[0n]+y[0n]−y[nn]+Z[0n]−Z[nn]

since the following values are known:

e[nn]−e[0n]+y[0n]−y[nn]

This amount of skew can be injected into each lane to provide total lane alignment within the resolution of the receiver.

Thus, the values for Z[0n] and Z[nn], in addition with the resolution of the receiver, has to be less than the allowable skew specified by the communication system or applicable standard (2 UI for SxI-5 compliancy, where UI is a Unit Interval of Time). The buffer, MUX, and PCB constraints have to be chosen such that this value is met.

To increase the number of transceivers from 3 to a higher number, the following procedure can be implemented and describes a general way to interconnect any number of transceivers. We will assume sequential names for the transceivers, i.e., MGT_0, MGT_1, MGT_2, etc., through to MGT_N.

From the N+1 transceivers, a reference transceiver must be chosen, e.g. MGT_0.

The receiver of each transceiver, with the exception of the reference transceiver, will require a 3:1 MUX. One of the inputs to this MUX will be the normal data line from an external source.

The transmission of the reference transceiver can be used as an input to the MUXs for each of the next transceivers in sequence, i.e. MGT_1 to MGT_N, if MGT_0 is chosen as the reference.

The transmission of each transceiver after the reference transceiver, MGT_1 to MGT_N to continue with the current naming convention, can be used as an input to the MUX for that same transceiver; i.e., the transmitter of MGT_1 goes to the receiver of MGT_1, the transmitter of MGT_2 goes to the receiver of MGT_2, etc.

By using this method, dual loopback is achieved using only external loopback methods.

It may be necessary to use a fanout buffer to mitigate any extra stress on the transmitting reference lane to preserve signal integrity.

By following this process, all skew values for each transmit lane can be determined relative to a single reference lane. Once the skew for each transmit lane is known relative to this single lane, the appropriate amount of skew can be injected into each lane to provide total lane alignment in compliancy with relevant standards, such as SxI-5. In order to accomplish this, the resolution of the receiver (typically 0.5 UI due to the RX PLL CDR, where PLL is the Phase-Locked Loop and CDR is Clock and Data Recovery) and the uncertainty added by any buffers, MUXs and traces have to be accounted for and be within the allowable skew values for the standard.

EXAMPLE 2

Both Internal and External Loopback

Using the present invention, when internal loopback is used within a transceiver, one of the inputs to the multiplexer can be eliminated. The internal loopback takes the place of one of the external loopbacks. Since the internal loopback can be selected or de-selected within the transceiver, the need for an input to the multiplexer for this particular line is eliminated. Thus, the multiplexer only needs a minimum of 2 inputs for this configuration. This example is shown in FIG. 2.

Figure 2:
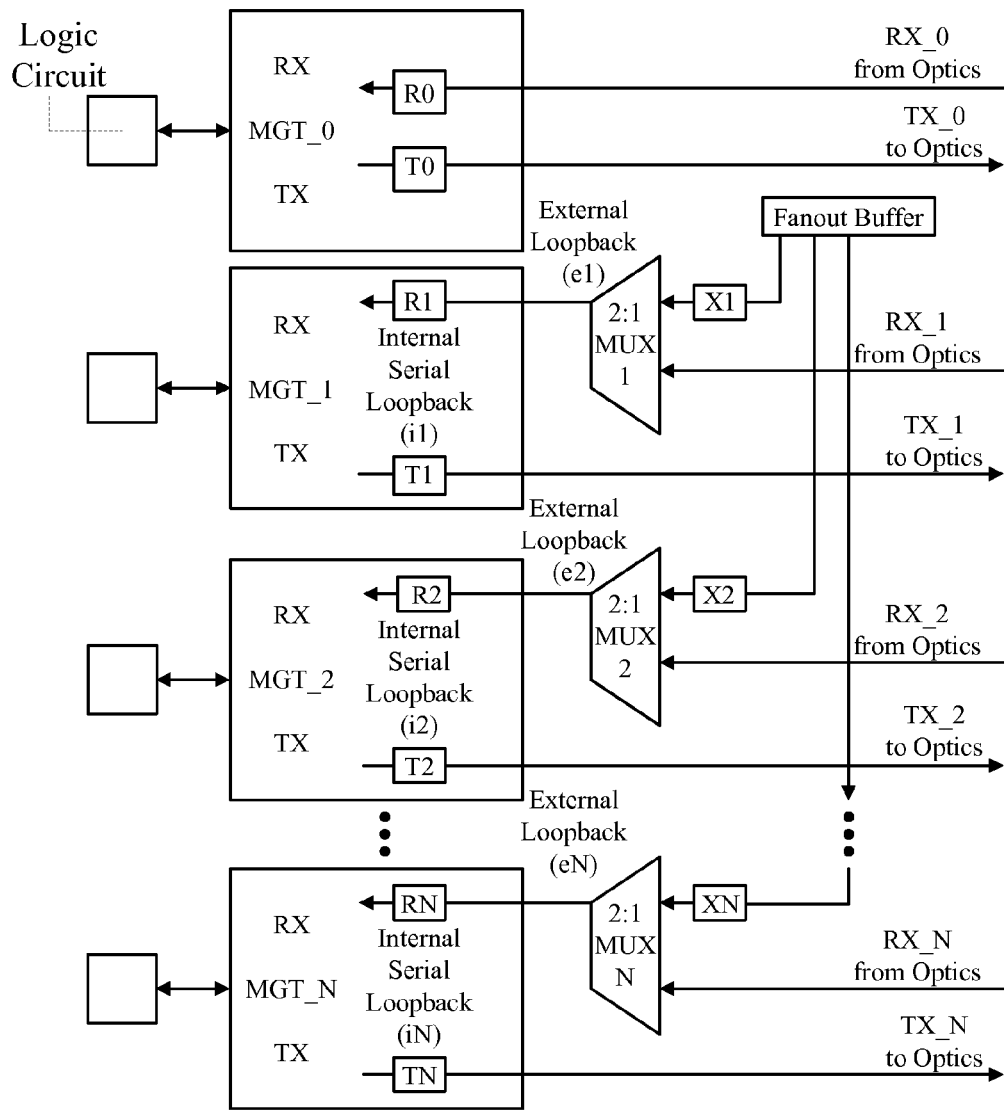
FIG. 2 is a block diagram of how the deskew algorithm may be implemented if both internal and external loopback are used to achieve the dual loopback methodology.

In Example 2, dual loopback is achieved by utilizing internal and external loopback to determine the relative skew amounts for each lane as illustrated in FIG. 2. The variables and constants used in this example are defined as:

DEFINITION LIST 2

| Term | Definition |
|------|------------|
| R1 | Unknown receive skew for MGT_1 |
| R2 | Unknown receive skew for MGT_2 |
| T0 | Unknown transmit skew for MGT_0 |
| T1 | Unknown transmit skew for MGT_1 |
| T2 | Unknown transmit skew for MGT_2 |
| X1 | Unknown external skew for path from MGT_0 to MGT_1, from buffer, MUX, and PCB trace skew |
| X2 | Unknown external skew for path from MGT_1 to MGT_2, from buffer, MUX, and PCB trace skew |
| i1 | Known internal skew constant for MGT_1 |
| i2 | Known internal skew constant for MGT_2 |
| E1 | Known external skew constant from MGT_0 to MGT_1 |
| E2 | Known external skew constant from MGT_1 to MGT_2 |

Constants i1, i2, e1, and e2 may be determined through empirical means, such as testing with a training sequence.

With reference to FIG. 2, the following equations can be formulated:

$$T0+R1+X1=e1 \tag{5}$$

$$T1+R1=i1 \tag{6}$$

$$T0+R2+X2=e2 \tag{7}$$

$$T2+R2=i2 \tag{8}$$

From equations (5) and (6), R1 can be equated, giving:

$$e1-T0-X1=i1-T1$$

Therefore, $$T1=T0+i1-e1+X1$$

Similarly from equations (7) and (8) by equating R2, $$e2-T1-X2=i2-T2$$

Thus, $$T2=T0+i2-e2+X2$$

And in general, $$T[n]=T0+i[n]-e[n]+X[n]$$

By taking T0 (the transmit skew for MGT_0) as a reference, it is shown that T1 can be found relative to this skew, and similarly, T2 can be found relative to T0's skew, with 1 unknown still remaining in each equation; X[n], where [n] corresponds to the MGT number.

Each X[n] value can be calculated using standard procedures for trace length and PCB characteristics, as well as taking into account the skew added by each MUX and the buffer. These values can be calculated to an approximate theoretical value with some amount of uncertainty in each calculation. Therefore, each X[n] value can be broken into the theoretical calculated value and a statistical variation from this value:

$$X[n]=y[n]+Z[n]$$

where y[n] is the theoretical calculated value and Z[n] is the statistical variation from this value.

Thus, the equations can be written as:

$$T[n]=T0+i[n]-e[n]+y[n]+Z[n]$$

where Z[n] is the only unknown.

As shown by the equation above, the amount of skew between T[n] and T0 is:

$$i[n]-e[n]+y[n]-+Z[n]$$

since the following values are known:

$$i[n]-e[n]+y[n]$$

This amount of skew can be injected into each lane to provide total lane alignment to within the resolution of the receiver.

Thus, the value for Z[n] in addition with the resolution of the receiver has to be less than the allowable skew specified by the applicable standard (2 UI for SxI-5 compliancy). The buffer, MUX, and PCB constraints have to be chosen such that this value is met.

To increase the number of transceivers from 3 to a higher number, the following procedure can be implemented and describes a general way to interconnect any number of transceivers. We will assume sequential names for the transceivers, i.e., MGT_0, MGT_1, MGT_2, etc., through to MGT_N.

From the N+1 transceivers, a reference transceiver must be chosen, e.g. MGT_0.

The receiver of each transceiver, with the exception of the reference transceiver, will require a 2:1 MUX. One of the inputs to this MUX will be the normal data line from an external source.

Each transceiver, with the exception of the reference transceiver, will employ internal loopback from the transmitter to the receiver of the transceiver. This internal loopback must be selectable within the transceiver to eliminate the need for any external circuitry.

The transmission of the reference transceiver can be used as an input to the MUXs for each of the next transceivers in sequence, i.e., MGT_1 to MGT_N, if MGT_0 is chosen as the reference.

By using this method, dual loopback is achieved using both internal and external loopback methods.

It may be necessary to use a fanout buffer to mitigate any extra stress on the transmitting reference lane to preserve signal integrity.

By following this process, all skew values for each transmit lane can be determined relative to a single reference lane. Once the skew for each transmit lane is known relative to this single lane, then the appropriate amount of skew can be injected into each lane to provide total lane alignment in compliancy with relevant standards, such as SxI-5. In order to accomplish this, the resolution of the receiver (typically 0.5 UI due to the RX PLL CDR) and the uncertainty added by any buffers, MUXs and traces have to be accounted for and be within the allowable skew values for the standard.

EXAMPLE 3

Internal Loopback Only

In this example, internal loopback is used within a transceiver and between transceivers. This results in dual loopback and hence elimination of the entire multiplexer. The internal loopback takes the place of one of the external loopbacks, while the internal loopback between transceivers takes the place of the other external loopback. Since both internal loopbacks can be selected or de-selected within the transceivers, the need for an external multiplexer is eliminated. This example is shown in FIG. 3.

Figure 3:
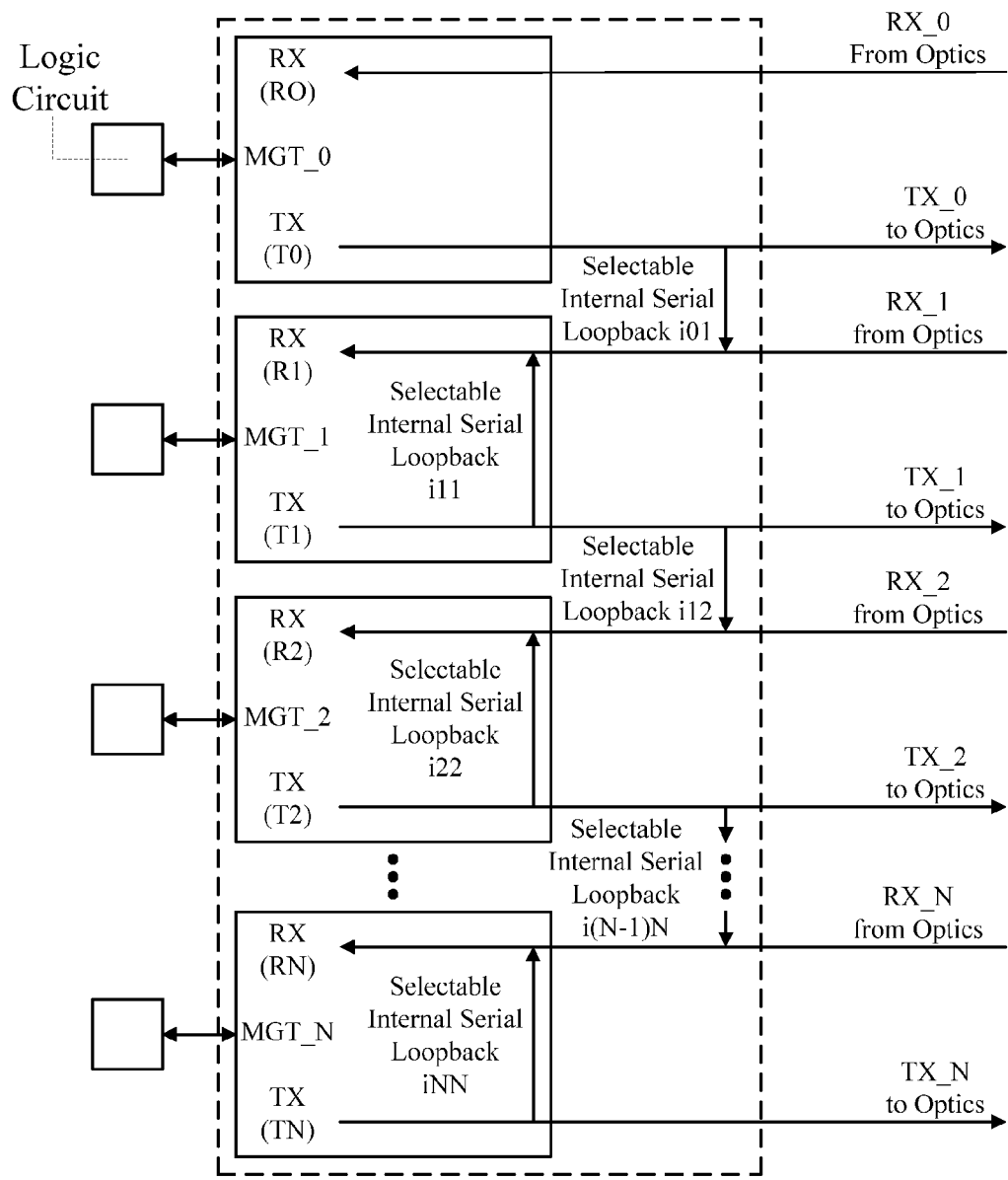
FIG. 3 is a block diagram of how the deskew algorithm may be implemented if only internal loopback is used to achieve the dual loopback methodology.

In Example 3, dual loopback is achieved by utilizing only internal loopback to determine the relative skew amounts for each lane as illustrated in FIG. 3. The variables and constants used in this example are defined as:

DEFINITION LIST 3

| Term | Definition |
|------|------------|
| R1 | Receive skew for MGT_1 |
| R2 | Receive skew for MGT_2 |
| T0 | Transmit skew for MGT_0 |
| T1 | Transmit skew for MGT_1 |
| T2 | Transmit skew for MGT_2 |
| I11 | Known internal skew constant for MGT_1 |
| I22 | Known internal skew constant for MGT_2 |
| I01 | Known internal skew constant from MGT_0 to MGT_1 |
| I12 | Known internal skew constant from MGT_1 to MGT_2 |

Constants i11, i22, i01, and i12 may be determined through empirical means, such as testing with a training sequence.

With reference to FIG. 3, the following equations can be formulated:

$$T1+R1=i11 \qquad (9)$$

$$T2+R2=i22 \qquad (10)$$

$$T0+R1=i01 \qquad (11)$$

$$T1+R2=i12 \qquad (12)$$

From equations (9) and (11), R1 can be equated, giving:

$$i11-T1=i01-T0$$

Therefore, $$T1=T0+i11-i01$$

Similarly from equations (10) and (12) by equating R2, $$i22-T2=i12-T1$$

Thus, $$T2=T1+i22-i12$$

By taking T0 (the transmit skew for MGT_0) as a reference, it is shown that T1 can be found relative to this skew, and similarly, T2 can be found relative to T1's skew (which is in turn relative to T0).

To increase the number of transceivers from 3 to a higher number, the following procedure can be implemented and describes a general way to interconnect any number of transceivers. We will assume sequential names for the transceivers, i.e., MGT_0, MGT_1, MGT_2, etc., through to MGT_N.

From the N+1 transceivers, a reference transceiver must be chosen, e.g. MGT_0.

Each transceiver, with the exception of the reference transceiver, will employ internal loopback from the transmitter to the receiver of the transceiver. This internal loopback must be selectable within the transceiver to eliminate the need for any external circuitry.

The transceivers must be configured in such a way that internal loopback is able to be selected and de-selected between different transceivers without the addition of extra circuitry.

The transmission of the reference transceiver can be used as an input for the internal loopback of the next transceiver in sequence, i.e. MGT_1, if MGT_0 is chosen as the reference.

The transmission of the next transceiver after the reference transceiver, MGT_1, to continue with the current naming convention, can be used as an input for the internal loopback of the next transceiver in sequence, i.e. MGT_2.

This process continues until the last transceiver is reached, i.e. MGT_N. The transmission from this transceiver does not need to be used as an input to an internal loopback.

By using this method, dual loopback is achieved using only internal loopback methods.

By following this process, all skew values for each transmit lane can be determined relative to a single reference lane. Once the skew for each transmit lane is known relative to this single lane, the appropriate amount of skew can be injected into each lane to provide total lane alignment in compliancy with relevant standards, such as SxI-5. In order to accomplish this, the resolution of the receiver (typically 0.5 UI due to the RX PLL CDR) has to be accounted for and be within the allowable skew values for the standard.

The previously explained loopback methods are only considered as examples. Different configurations of each are possible as long as dual loopback is achieved. Combined configurations of each are also possible as long as dual loopback is achieved.

Figure 4:
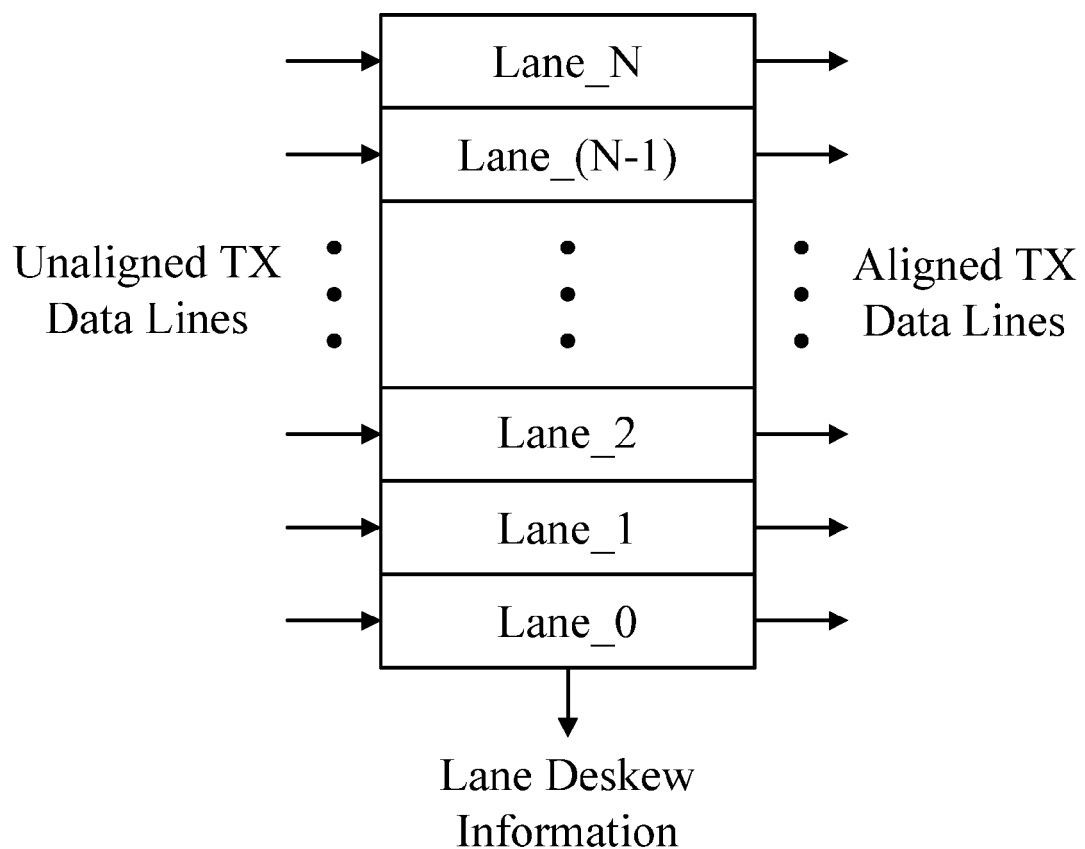
FIG. 4 is a block diagram of how the skew injection technique may be implemented.
Figure 5:
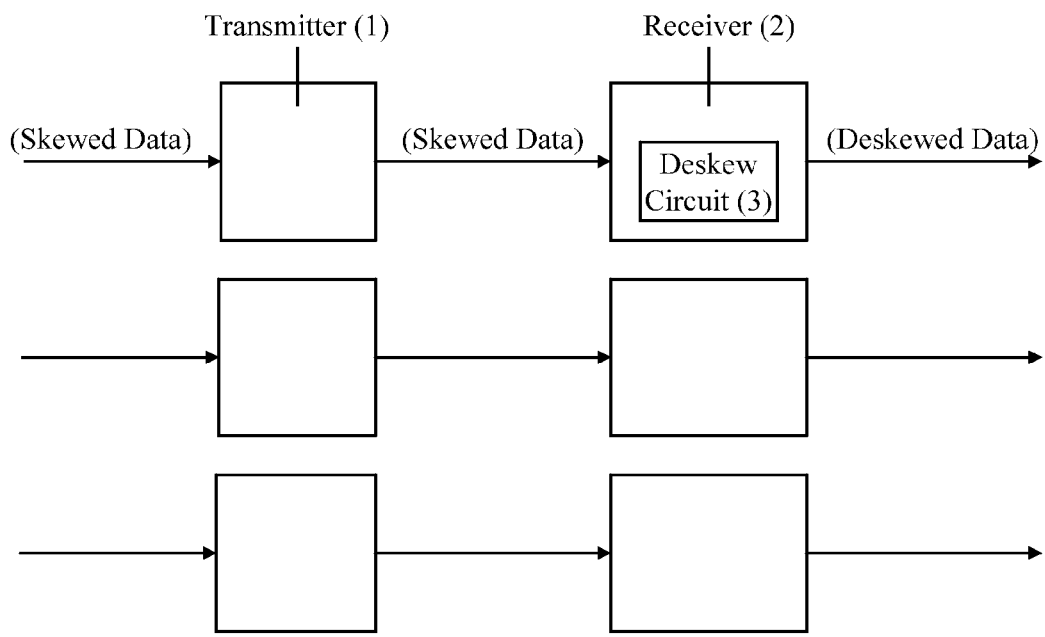
FIG. 5 is a block diagram of a prior art skew correction apparatus, where skewed data enters a transmitter (1) and is then sent down the transmitting lane to a receiver (2), where the skewed data is corrected by a deskew circuit (3).

In order to inject the appropriate amount of skew into each lane to provide lane alignment, the unaligned transmit (TX) data lines enter a buffer, such as a First-In-First-Out (FIFO), for the purposes of lane deskewing. The skew values to be injected for each lane are supplied to the buffer. The buffer then shifts each lane the appropriate amount to ensure lane-to-lane alignment. A representation of a possible embodiment of this injection system is shown in FIG. 4. The output from the buffer is the aligned TX data lines, which can then be categorized as being within skew specifications for relevant standards.

REFERENCES CITED

U.S. Patent Documents

| | | | |
|---|---|---|---|
| 6557110 | April, 2003 | Sakamoto et al. | 713/503 |
| 6690757 | February, 2004 | Bunton et al. | 375/371 |
| 6820234 | November, 2004 | Deas et al. | 714/814 |
| 6839862 | January, 2005 | Evoy et al. | 713/503 |
| 6907552 | June, 2005 | Collins | 714/700 |
| 6920576 | July, 2005 | Ehmann | 713/400 |
| 6996738 | February, 2006 | Chiang | 713/503 |

OTHER REFERENCES

OIF, System Framer Interface Level 5 (SFI-5), 29 Jan. 2002

OIF, System Interface Level 5 (SxI-5), October 2002

What is claimed is:

1. A skew detection apparatus for detecting the amount of skew in at least one of a plurality of transmitting lanes, in relation to a reference lane, of a parallel data transmission system, comprising:
   (a) one of a plurality of transceivers coupled to one of said plurality of transmitting lane pairs, one of said plurality of transceivers comprising a transmitter and a receiver, wherein one of said plurality of transmitting lane pairs is a reference lane and one of said plurality of transceivers is a reference transceiver;
   (b) a dual loopback coupled from one or more outputs from said transmitter to one or more inputs of said receiver via a multiplexer, wherein said multiplexer selects data from a plurality of data, said plurality of data comprising regular data and a plurality of loopback data, wherein said multiplexer selects one of said plurality of data, whereby any other of said plurality of data can subsequently be selected by said multiplexer to change from one of said plurality of data to any other of said plurality of data; and
   (c) a logic circuit to implement an equation to detect an amount of skew in at least one of said plurality of transmitting lane pairs through said plurality of loopback data, whereby said amount of skew indicates offsetting skew to be injected into any of said plurality of transmitting lane pairs, at the transmit side of a circuit, to re-align said plurality of transmitting lane pairs and achieve transmission lane alignment.

2. The apparatus of claim 1, wherein said reference lane and said reference transceiver are chosen from said plurality of transmitting lane pairs and said plurality of transceivers, or said reference lane and said reference transceiver are provided in addition to said plurality of transmitting lane pairs and said plurality of transceivers for the purpose of providing said reference lane to said plurality of transmitting lane pairs and said reference transceiver to said plurality of transceivers.

3. The apparatus of claim 1, wherein dual loopback is achieved by using said plurality of loopback data, said plurality of loopback data comprising internal loopback and external loopback for each of said plurality of transceivers, wherein dual loopback to said reference lane and said reference transceiver may or may not be implemented.

4. The apparatus of claim 1, wherein dual loopback is achieved by using external loopback for each of said plurality of transceivers, wherein dual loopback to said reference lane and said reference transceiver may or may not be implemented.

5. The apparatus of claim 1, wherein dual loopback is achieved by using internal loopback for each of said plurality of transceivers, wherein dual loopback to said reference lane and said reference transceiver may or may not be implemented.

6. The apparatus of claim 1, wherein internal loopback is selected by said plurality of transceivers, said plurality of data being selectable by said plurality of transceivers to achieve dual loopback.

7. The apparatus of claim 1, wherein external loopback is selected by a plurality of external circuitry elements, said plurality of data being selectable by said plurality of external circuitry elements to achieve dual loopback.

8. The apparatus of claim 7, wherein said external circuitry elements is a second multiplexer, said second multiplexer comprising: at least one of a plurality of inputs for said plurality of transmitting lane pairs, wherein said plurality of transmitting lane pairs are used for external loopback; at least one of a plurality of inputs for said plurality of transmitting lane pairs, wherein said plurality of transmitting lane pairs are used for regular data; and at least one of a plurality of outputs to a receive terminal of one of said plurality of transceivers, wherein said plurality of transceivers may or may not include said reference transceiver.

9. The apparatus of claim 1, wherein a plurality of internal skew constants comprising internal skew from internal loopback between said plurality of transceivers and within said plurality of transceivers, wherein said plurality of transceivers may or may not include said reference transceiver, are determined through empirical information determined through a mode of empirical testing, wherein said mode of empirical testing is a training sequence.

10. The apparatus of claim 1, wherein a plurality of external skew constants comprising external skew from external loopback between said plurality of transceivers, wherein said plurality of transceivers may or may not include said reference transceiver, are determined through empirical information determined through said mode of empirical testing, wherein said mode of empirical testing is said training sequence.

11. The apparatus of claim 1, wherein said empirical information is determined by said mode of empirical testing, wherein said mode of empirical testing is said training sequence, wherein said training sequence is a Pseudo-Random Bit Sequence (PRBS) pattern.

12. A skew correction apparatus for detecting and correcting the amount of skew in at least one of a plurality of transmitting lanes, in relation to a reference lane, of a parallel data transmission system, comprising:
  (a) one of a plurality of transceivers coupled to one of said plurality of transmitting lane pairs, one of said plurality of transceivers comprising a transmitter and a receiver, wherein one of said plurality of transmitting lane pairs is a reference lane and one of said plurality of transceivers is a reference transceiver;
  (b) a buffer to delay said plurality of transmitting lane pairs by a Unit Interval of Time (UI); and
  (c) a logic circuit to implement an equation to detect an amount of skew in at least one of said plurality of transmitting lane pairs through a plurality of loopback data, whereby said amount of skew indicates to said buffer the offsetting skew to be injected into any of said plurality of transmitting lane pairs, at the transmit side of a circuit, to re-align said plurality of transmitting lane pairs and achieve transmission lane alignment.

13. The apparatus of claim 12, wherein said reference lane and said reference transceiver are chosen from said plurality of transmitting lane pairs and said plurality of transceivers, or said reference lane and said reference transceiver are provided in addition to said plurality of transmitting lane pairs and said plurality of transceivers for the purpose of providing said reference lane to said plurality of transmitting lane pairs and said reference transceiver to said plurality of transceivers.

14. The apparatus of claim 12, wherein said buffer is a First-In-First-Out (FIFO) buffer.

* * * * *